US008940834B2

(12) United States Patent
Bayer et al.

(10) Patent No.: US 8,940,834 B2
(45) Date of Patent: *Jan. 27, 2015

(54) PARTIALLY AROMATIC POLYAMIDE MOULDING COMPOSITIONS AND THEIR USES

(75) Inventors: Andreas Bayer, Domat/Ems (CH); Manfred Hewel, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,177

(22) Filed: Jul. 8, 2011

(65) Prior Publication Data

US 2012/0022194 A1  Jan. 26, 2012

(30) Foreign Application Priority Data

Jul. 23, 2010 (EP) ..................................... 10170578

(51) Int. Cl.
| C08L 77/00 | (2006.01) |
| C08G 69/26 | (2006.01) |
| C08L 77/06 | (2006.01) |
| C08K 3/00 | (2006.01) |
| C08K 5/00 | (2006.01) |
| C08K 5/51 | (2006.01) |
| C08L 23/08 | (2006.01) |

(52) U.S. Cl.
CPC ............... C08G 69/265 (2013.01); C08L 77/06 (2013.01); C08K 3/0058 (2013.01); C08K 5/0066 (2013.01); C08K 5/51 (2013.01); C08L 23/0876 (2013.01)
USPC ............ 524/607; 524/133; 524/434; 525/179

(58) Field of Classification Search
USPC ................... 524/210, 494; 428/402; 525/221
See application file for complete search history.

(56) References Cited

U.S. PATENT DOCUMENTS

| 3,845,163 | A | 10/1974 | Murch et al. | |
| 7,825,191 | B2 * | 11/2010 | Morris et al. | 525/221 |
| 2001/0003766 | A1 | 6/2001 | Nozaki | |
| 2004/0242737 | A1 | 12/2004 | Topulos | |
| 2008/0274355 | A1 * | 11/2008 | Hewel | 428/402 |
| 2009/0062452 | A1 * | 3/2009 | Harder et al. | 524/494 |
| 2011/0196080 | A1 * | 8/2011 | Matsuoka et al. | 524/210 |

FOREIGN PATENT DOCUMENTS

| EP | 0 356 978 A2 | | 3/1990 |
| EP | 1 988 113 A1 | | 11/2008 |
| JP | 3-88846 A | | 4/1991 |
| WO | WO 2009/017043 | * | 5/2009 |

* cited by examiner

Primary Examiner — Susannah Chung
Assistant Examiner — Robert T Butcher
(74) Attorney, Agent, or Firm — Sughrue Mion, PLLC

(57) ABSTRACT

An unreinforced, halogen-free polyamide moulding composition having the following composition: (A) 62-87% by weight of a partially aromatic, partially crystalline copolyamide having a melting point of 270° C. to 320° C. and made up of 100% by weight of diacid fraction composed of: 50-100% by weight of terephthalic acid (TPA) and/or naphthalenedicarboxylic acid; 0-50% by weight of isophthalic acid (IPA), and 100% by weight of diamine fraction; (B) 5-15% by weight of ionomer; (C) 8-18% by weight of flame retardants; (D) 0-5% by weight of additives; where the components (A)-(D) add up to 100% by weight.

25 Claims, 1 Drawing Sheet

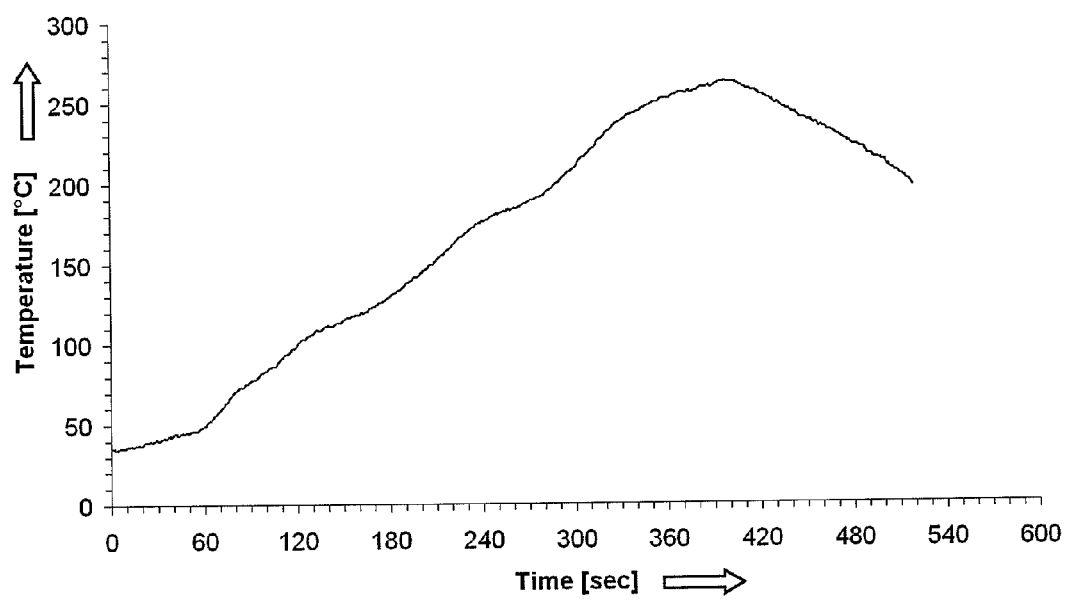

PARTIALLY AROMATIC POLYAMIDE MOULDING COMPOSITIONS AND THEIR USES

TECHNICAL FIELD

The present invention relates to unreinforced polyamide moulding compositions which are made flame resistant without use of halogen-containing flame retardants and are based on a terephthalic acid copolyamide and processes for preparing them and uses thereof.

PRIOR ART

In the electrical and electronics sector, polymeric materials
  which can be soldered without blisters, even after having absorbed water, by means of lead-free solder at a surface temperature of 260° C.,
  which are made flame resistant without use of halogen-containing flame retardants and reliably achieve the UL94 classification V0,
  which have an elongation at break of at least 5%, and
  which can be readily processed at low pressures and high flow lengths without deposits in the mould,
are required.

Compounds of aliphatic polyamides provided with flame retardants have melting points which are too low and/or a water absorption which is too high, so that they have unsatisfactory solderability in the conditioned state. In addition, unreinforced PA66 and PA6 compounds provided with flame retardants, for example, have unsatisfactory HDT values.

Compounds which are based on partially aromatic polyamides of the type PA6T/66 and are provided with flame retardants as described in JP 2928325 have sufficiently high melting points but absorb a relatively large amount of water. They can be soldered in the dry state and achieve a maximum moisture sensitivity level (SML) in accordance with Joint Industry Standard IPC/JEDEC J-STD-020D.1) of 2, i.e. they can be conditioned for a maximum of 168 hours at 85° C. and 60% relative humidity before soldering. This generally means that the electronic components made of these materials do not have an unlimited storage life and have to be packed in a moisture-tight manner until they are soldered. Unreinforced moulding compositions provided with flame retardants generally have an unsatisfactory low elongation at break. Similarly, mixtures of an aromatic polyamide with a considerable proportion of filler and an impact modifier are known from US 2001/003766. As impact modifiers, it is possible to use ionomers and the mixtures are said to be able to be used, for example, for electronic components. It is stated that it is possible to add additives such as pigments to such a polyamide, although this document is not concerned with soldering processes and in any case the polyamides proposed in this document are unsuitable for soldering processes because of the excessively high water absorption and the excessively high proportions of amorphous material and therefore severe blistering, even if they do have high melting points of, for example, 305 degrees celsius. Furthermore, the products reinforced with glass fibres have an elongation at break which is too low.

EP 1 988 113 describes polyamides which have from 40 to 95 mol % of 10T units formed by the monomers 1,10-decanediamine and terephthalic acid and from 5 to 60 mol % of 6T units formed by the monomers 1,6-hexanediamine and terephthalic acid. These polyamides have high heat distortion resistances, good processability, low water absorption, unchanged mechanical properties after water absorption, good surface quality of the glass fibre-reinforced products and high dimensional stability. The solderability at 260° C. after absorption is significantly better than that of partially aromatic polyamides of the PA6T/66 type. The solderability of the electrical and electronic components made of glass fibre-reinforced PA10T/6T is a given, i.e. they can achieve the maximum moisture sensitivity level (SML in accordance with Joint Industry Standard IPC/JEDEC J-STD-020D.1) of 1 when suitably designed. Although the elongation at break of these moulding compositions can be improved by means of conventional impact modifiers such as EPR or EPDM, the moulding compositions which have been modified in this way no longer reliably achieve the UL94 classification V0 and solderability is not ensured.

U.S. Pat. No. 3,845,163 describes blends which are composed of from 60 to 85% by weight of polyamide and from 15 to 40% by weight of ionomers based on α-olefins and α,β-unsaturated carboxylic acids and have an improved join strength when the free carboxyl groups are neutralized to an extent of at least 10% with metal ions. Blends of PA66 and ionomers of ethylene and methacrylic acid neutralized with sodium or zinc ions are processed. These blends cannot be soldered at 260° C. and are not provided with flame retardant.

EP0356978A2 relates to moulding compositions which are based on PA6, PA66 and PA66/6 and 10-25% by weight of ionomer and are said to be stiff and tough and also free of deposits in the mould. The ionomers used are partially neutralized with metal ions and are composed of ethylene, methacrylic acid and alkyl acrylates, in particular butyl acrylate. These moulding compositions are not solderable and are not provided with flame retardant.

DESCRIPTION OF THE INVENTION

It is therefore an object of the invention to provide unreinforced, halogen-free polyamide moulding compositions provided with flame retardants, from which it is possible to produce electric and/or electronic components and which can be reliably soldered, i.e. in particular without blisters being formed in the soldering process, in particular at 260° C. and possibly higher temperatures after water absorption and in the case of critical designs of the components, and which have an elongation at break of at least 5% and reliably achieve the UL94 classification V0.

The object is achieved by polyamide moulding compositions according to Claim 1, i.e. in the broadest sense on the basis of partially aromatic, partially crystalline polyamides having a specific melting point range, an effective amount of ionomers which have been partially or completely neutralized by means of metal ions, and flame retardants, preferably on the basis of phosphinic acid or diphosphinic acid salts.

The solderability (for definition, see below) of the moulded compositions of the invention is at least 80%, preferably greater than 85%. The solderability is defined as relative proportion of the positively tested rods of three different thicknesses without blisters under 6 different test conditions after conditioning for 168 hours at 85° C. and 85% relative humidity in accordance with Joint Industry Standard IPC/JEDEC J-STD-020D.1.

For the unreinforced moulding compositions to be able to meet the high temperature requirements in the soldering process, the parent polyamides have to have a sufficiently high melting point and should also not be amorphous. Thus, the polyamides according to the invention (component (A)) have a melting point in the range from 270 to 320° C., preferably in the range from 280 to 315° C. and in particular in the range from 290 to 310° C.

The polyamides comprise terephthalic acid (optionally at least partly replaced by naphthalenedicarboxylic acid) and at least one diamine selected from the group consisting of butanediamine, pentanediamine, hexanediamine, octanediamine, methyloctanediamine, nonanediamine, decanediamine, undecanediamine and dodecanediamine. Terephthalic acid can be replaced to an extent of not more than 50 mol % by isophthalic acid.

Preferred partially aromatic polyamides are, in particular, 4T/4I/46, 4T/4I/66, 5T/5I, 5T/5I/56, 5T/5I/66, 6T/6I/66, 6T/9T, 6T/10T, 6T/12T, 10T/6T, 10T/66, 10T/10I, 10T/10I/6T, 10T/6I, 6T/10T/6I, 6T/6I/10T/10I, 6T/10T/10I, 9T, 10T, 12T and also copolyamides of TPA, IPA, HMDA and a further aliphatic diamine having from 9 to 12 carbon atoms, in particular, for example, copolyamides of TPA, IPA, HMDA and decanediamine.

In a further preferred embodiment, the systems 6T and/or 6T/6I and 6I/6T are excluded, i.e. the general definition of the component (A) applies with the proviso that these specific systems are excluded.

Quite deliberately, the polyamide moulding composition proposed is preferably essentially free of fillers and/or reinforcing materials, in particular free of glass fibres, carbon fibres, etc. Free of these components means that the polyamide moulding composition does not contain any effective amount of such reinforcing materials. Typically, the desired target values for the elongation at break of at least 5%, preferably at least 6% and particularly preferably at least 7% could otherwise not be achieved.

In a further preferred embodiment, the copolyamides of the component (A) are composed of terephthalic acid (TPA), isophthalic acid (IPA), 1,6-hexanediamine (HMDA) and a further aliphatic diamine having from 9 to 12 carbon atoms (C9-C12-diamine), with a defined content of C9-C12-diamine and isophthalic acid being adhered to. These copolyamides preferably have a melting point in the range from 300 to 315° C., a high crystallinity, a glass transition temperature preferably in the range from 110 to 140° C.

Specifically, the present invention provides, in particular, a polyamide moulding composition having the following composition:
(A) 62-87% by weight of a partially aromatic, partially crystalline copolyamide having a melting point of from 270° C. to 320° C. and made up of
100% by weight of diacid fraction composed of:
50-100% by weight of terephthalic acid (TPA) and/or naphthalene-dicarboxylic acid;
0-50% by weight of isophthalic acid (IPA) and 100% by weight of diamine fraction composed of at least one diamine selected from the group consisting of:
butanediamine, pentanediamine, hexanediamine, octanediamine, methyloctanediamine, nonanediamine, decanediamine, undecanediamine and dodecanediamine;
(B) 5-15% by weight of ionomer;
(C) 8-18% by weight of flame retardant;
(D) 0-5% by weight of additives;
where the components (A)-(D) add up to 100% by weight.

The diacid fraction of the component (A) is preferably composed of 50-98.3% by weight, preferably 50-95% by weight or 72.0-98.3% by weight, of terephthalic acid (TPA) (and/or naphthalenedicarboxylic acid) and 1.7-50% by weight, or 5.0-50% by weight or 1.7-28% by weight, of isophthalic acid (IPA), at a total of all diacids of 100% by weight.

Furthermore, the diamine fraction of the component (A) is preferably composed of 10-80% by weight of at least one C4-C6 diamine, preferably at least one such diamine selected from the group consisting of: 1,4-butanediamine, 1,5-pentanediamine, 1,6-hexane-diamine (HMDA); and 20-90% by weight of at least one further diamine, namely a C9-C12 diamine.

In a further embodiment, the diamine fraction of the component (A) is composed of 1,6-hexanediamine, preferably in a proportion of 51-80% by weight; and one or more C9-C12 diamines, preferably in a proportion of 20-49% by weight. In these embodiments, the amounts of diamines add up to 100% by weight of the total diamine fraction.

According to a preferred embodiment, the C9-C12-diamine is a diamine selected from the group consisting of: 1,9-nonanediamine, methyl-1,8-octanediamine, 1,10-decanediamine, 1,11-undecanediamine, 1,12-dodecanediamine or a mixture of such diamines, with 1,10-decanediamine and 1,12-dodecanediamine and in particular 1,10-decanediamine alone being preferred.

As mentioned above, the component (A) is preferably selected from the group consisting of 4T/4I/46, 4T/4I/66, 5T/5I, 5T/5I/56, 5T/5I/66, 6T/6I/66, 6T/9T, 6T/10T, 6T/12T, 10T/6T, 10T/66, 10T/10I, 10T/10I/6T, 10T/6I, 6T/10T/6I, 6T/6I/10T/10I, 6T/10T/10I, 9T, 10T, 12T, where these systems are selected so that they have a melting point in the range mentioned.

The diamine fraction of the component (A) is preferably composed of 55-75% by weight of 1,6-hexanediamine (HMDA); 25-45% by weight of C9-C12-diamine.

The diamine fraction of component (A) is more preferably composed of 55-70% by weight of 1,6-hexanediamine (HMDA) and 30-45% by weight of C9-C12-diamine.

In a preferred embodiment of the invention, the proportion of C9-C12-diamines and the proportion of isophthalic acid are present in a particular ratio to one another. Specifically, this means that in this preferred embodiment, the diacid fraction of the component (A) is composed of 72.0-98.3% by weight of terephthalic acid (TPA) and/or naphthalene-dicarboxylic acid and an isophthalic acid (IPA) content in a % by weight range determined as a function of the content of C9-C12-diamine in percent of the diamine fraction. The content of isophthalic acid in percent by weight preferably determined according to the formula $$IPA(\% \text{ by weight})=(39-0.7*C9\text{-}C12\text{-diamine})$$

is in a range of +/−5% by weight. Preferably, this is generally with the proviso that the content of isophthalic acid is always at least 1.7% by weight.

This means that, for example at a content of C9-C12-diamines of 20% by weight, the content of isophthalic acid is in the range 20-30% by weight. At a content of C9-C12-diamines of 35% by weight, the content of isophthalic acid is in the range 9.5-19.5% by weight. At a content of C9-C12-diamines of 49% by weight, the content of isophthalic acid is in the range 1.7-9.7% by weight.

In a further preferred embodiment, the range is +/−3% by weight, particularly preferably +/−2% by weight.

Preference is thus given, for example for component (A) to polyamides having a C9-C12-diamine content of from 20 to 49% by weight based on the sum of the diamines and an IPA content of (39−0.7*C9-C12-diamine)±5% by weight based on the sum of the diacids, with the content of IPA always being at least 1.7% by weight.

In further particular embodiments, the following compositions are preferred for the copolyamides (polyamide matrix):
copolyamides having a C9-C12-diamine content of from 20 to 49% by weight based on the sum of the diamines and an IPA content of (39−0.7*C9-C12-diamine)±3% by weight based on the sum of the diacids.

Copolyamides having a C9-C12-diamine content of from 20 to 49% by weight based on the sum of the diamines and an IPA content of (39−0.7*C9-C12-diamine)±2% by weight based on the sum of the diacids.

Preference is given to polyamides having a C9-C12-diamine content of from 25 to 45% by weight based on the sum of the diamines and an IPA content of (39−0.7*C9-C12-diamine)±5% by weight based on the sum of the diacids.

Copolyamides having a C9-C12-diamine content of from 25 to 45% by weight based on the sum of the diamines and an IPA content of (39−0.7*C9-C12-diamine)±3% by weight based on the sum of the diacids.

Copolyamides having a C9-C12-diamine content of from 25 to 45% by weight based on the sum of the diamines and an IPA content of (39−0.7*C9-C12-diamine)±2% by weight based on the sum of the diacids.

Preference is given to polyamides having a C9-C12-diamine content of from 30 to 45% by weight based on the sum of the diamines and an IPA content of (39−0.7*C9-C12-diamine)±5% by weight based on the sum of the diacids.

Copolyamides having a C9-C12-diamine content of from 30 to 45% by weight based on the sum of the diamines and an IPA content of (39−0.7*C9-C12-diamine)±3% by weight based on the sum of the diacids.

Copolyamides having a C9-C12-diamine content of from 30 to 45% by weight based on the sum of the diamines and an IPA content of (39−0.7*C9-C12-diamine)±2% by weight based on the sum of the diacids.

Among the further aliphatic diamines (C9-C12-diamine) preference is given to 1,10-decanediamine and 1,12-dodecaenediamine, with particular preference being given to using 1,10-decanediamine.

The partially aromatic, partially crystalline copolyamide (component (A)) has a solution viscosity $\eta_{rel}$, measured in m-cresol (0.5% by weight, 20° C.), of not more than 2.0, preferably not more than 1.9, in particular not more than 1.8. Preference is given to copolyamides having a solution viscosity $\eta_{rel}$ in the range from 1.45 to 2.0, in particular in the range from 1.5 to 1.9 or from 1.5 to 1.8.

The copolyamides (component A) preferably have a glass transition temperature in the range from 110 to 140° C., preferably in the range from 115 to 135° C. and in particular in the range from 120 to 130° C.

The melting point is preferably in the range from 270 to 320° C., more preferably in the range from 280 to 315° C. and in particular in the range from 290 to 310° C.

The enthalpy of fusion of the copolyamides, which is, after all, a measure of the degree of crystallinity, is preferably in the range from 30 to 60 J/g, more preferably in the range from 35 to 60 J/g and particularly preferably in the range from 40 to 60 J/g.

If the proportion of amorphous material in the copolyamides is high, which can be seen from the low enthalpy of fusion, the strength at the soldering temperatures in the region of 260° C. is too low and the moulding composition is unsuitable for such applications.

Furthermore, the compositions are preferably formulated so that the component (A) and/or the entire polyamide moulding composition has a water absorption of less than 5% by weight, preferably less than 4% by weight, e.g. after 336 hours in water at 95° C. If the water absorption is too high, the material is likewise unsuitable for such soldering applications; it is found that, in particular, a good balance of low water absorption and a low proportion of amorphous material (i.e. enthalpy of fusion in the correct range) but at a suitably high and not too high melting point is particularly suitable and can prevent blistering during the soldering process.

As long as the properties just described are achieved, up to 8% by weight, preferably up to 5% by weight and particularly preferably up to 3% by weight, of the aromatic dicarboxylic acids in the component (A) can be replaced by aliphatic dicarboxylic acids having from 10 to 36 carbon atoms. Preferred aliphatic diacids are sebacic acid and dodecanedioic acid. Furthermore, up to 8% by weight, preferably up to 5% by weight and particularly preferably up to 3% by weight, of the diamines can be replaced by 1,4-butanediamine, 1,5-pentanediamine, methyl-1,5-pentanediamine, bis(aminomethyl)cyclohexane, bis(4-amino-3-methylcyclohexyl)methane (MACM), bis(4-aminocyclohexyl)methane (PACM), m-xylylenediamine (MXDA) or p-xylylenediamine (PXDA). Based on the sum of diamines and diacids, up to 5% by weight of lactams or aminocarboxylic acids, in particular laurolactam or aminolauric acid, can be present in component (A). However, particular preference is given to the embodiment in which component (A) is formed exclusively by the aromatic diacids TPA and IPA and the diamines 1,6-hexanediamine and at least one C9-C12-diamine, in particular 1,10-decanediamine.

An important constituent of the proposed polyamide moulding composition is the component (B). It is preferably present in a proportion in the range 7-12% by weight. The ionomers used as component (B) have small amounts of ionic groups bound to a nonpolar polymer chain. According to the invention, ionomers prepared from the monomers α-olefin, α,β-unsaturated carboxylic acid and optionally further comonomers, with the ionomers being completely or partially neutralized by metal ions, are used. Examples of the α-olefin are ethene, propene, butene, pentene and hexene, which are used either alone or in combination. Examples of the α,β-unsaturated carboxylic acid are acrylic acid, methacrylic acid, ethacrylic acid, itaconic acid, maleic anhydride, monoethyl maleate and maleic acid. The carboxylic acids can be used either alone or in combination. Preference is given to the carboxylic acids acrylic acid and methacrylic acid. Examples of comonomers according to the invention are acrylic esters, methacrylic esters, styrene, norbornene derivatives, etc. Commercial products are, for example AClyn (Honeywell) and Surlyn (DuPont).

Furthermore, the ionomer of the component (B) is thus generally preferably prepared from the monomers α-olefin, α,β-unsaturated carboxylic acid and optionally further comonomers, with the ionomer being completely or partially neutralized by metal ions.

The α-olefin is preferably selected from the group consisting of: ethene, propene, butene, pentene, hexene or a combination of these α-olefins.

The α,β-unsaturated carboxylic acid is preferably selected from the group consisting of: acrylic acid, methacrylic acid, ethacrylic acid, itaconic acid, maleic anhydride, maleic acid or a combination of these systems, with particular preference being given to using acrylic acid and/or methacrylic acid.

Furthermore, the comonomers mentioned are preferably selected from the group consisting of: acrylic esters, methacrylic esters, styrene, norbornene derivatives.

In general, preferably from 3 to 100 percent, in particular from 5 to 90 percent, of the carboxylic acid groups of these ionomers are neutralized with metal ions, where these metal ions are preferably selected from groups Ia, IIa, IIb, IIIc, IVa, VIb and VIII of the Periodic Table of the Elements, particularly preferably from the group consisting of lithium, sodium, potassium, zinc, tin, calcium, barium and magnesium. Particular preference is given to sodium and/or zinc.

The ethylene ionomers of the present invention can be prepared by direct or graft copolymerization. The process of direct copolymerization comprises polymerization of α-olefin, e.g. ethylene, an α,β-unsaturated carboxylic acid and optionally an unsaturated comonomer in the presence of a free-radical polymerization initiator, followed by neutralization of the carboxylic acid groups of the direct copolymer formed with metal ions.

The process of graft copolymerization can be carried out by polymerization of α-olefin, e.g. ethylene, and optionally comonomers in the presence of a free-radical polymerization initiator and grafting of the α,β-unsaturated carboxylic acid onto the ethylene-comonomer polymer backbone, followed by neutralization of the carboxylic acid groups of the graft copolymer formed with metal ions.

Furthermore, the ionomer of the component (B) is preferably selected from among ionomers based on the following group of systems: ethylene-acrylic acid; ethylene-methacrylic acid; ethylene-maleic anhydride; ethylene-acrylic acid-n-butyl acrylate; ethylene-methacrylic acid-n-butyl acrylate; ethylene-methacrylic acid-2-ethoxyethyl acrylate; ethylene-methacrylic acid-n-propyl acrylate; ethylene-acrylic acid-2-ethoxyethyl acrylate; ethylene-acrylic acid-n-octyl acrylate; ethylene-methacrylic acid-n-pentyl acrylate; ethylene-acrylic acid-n-pentyl acrylate; ethylene-acrylic acid-2-ethylhexyl acrylate; ethylene-acrylic acid-n-propyl acrylate; ethylene-acrylic acid-n-heptyl acrylate; ethylene-acrylic acid-2-methoxyethyl acrylate; ethylene-acrylic acid-3-methoxypropyl acrylate; ethylene-acrylic acid-3-ethoxypropyl acrylate and combinations of such ionomers.

Preference is given to the ionomer being quite specifically built up on the basis of a single acid component.

Preferred ethylene ionomers for use in the compositions of the present invention are, inter alia, ethylene-acrylic acid; ethylene-methacrylic acid; ethylene-methacrylic acid-n-butyl acrylate; ethylene-acrylic acid-n-butyl acrylate; ethylene-acrylic acid-2-methoxyethyl acrylate; ethylene-acrylic acid-ethylhexyl acrylate.

The ionomer of the component (B) is very particularly preferably selected from among ionomers based on the following group of systems: ethylene-(meth)acrylic acid and/or ethylene-(meth)acrylic acid-n-butyl acrylate.

Furthermore, the ionomer of the component (B) is preferably an ethylene ionomer having the composition E/X/Y, where E is 45-94% by weight of ethylene, X is 1-20% by weight of an unsaturated carboxylic acid selected from the group consisting of: acrylic acid, methacrylic acid, maleic acid, fumaric acid, itaconic acid and monoesters of maleic, fumaric and itaconic acids, and Y is 5-35% by weight of at least one further unsaturated comonomer.

The ionomer preferably has a melt flow index (MFI) in the range 0.5-5.0 g/10 min, preferably in the range 0.5-2.0 g/10 min, determined in accordance with ISO 1133 at 190° C. under a weight of 2.16 kg. The ionomers preferably have a melting point in the range from 60 to 120° C., particularly preferably in the range from 70 to 100° C.

The moulding composition of the invention additionally contains 8-18% by weight, preferably 9-18%, more preferably 10-17% by weight and in particular 12-16% by weight, of a flame retardant, (as part of the component (C) or forming the entire component (C)).

The flame retardant in the component (C) or forming the entire component (C) preferably comprises 60-100% by weight, more preferably 70-100% by weight or 70-98% by weight, in particular 80-100% by weight or 80-96% by weight, of a phosphinic acid salt and/or diphosphinic acid salt (component (C1)) and 0-40% by weight, preferably 0-30% by weight or 2-30% by weight, in particular 0-20% by weight or 4-20% by weight, of a nitrogen-containing synergist and/or a nitrogen- and phosphorus-containing flame retardant (component (C2)).

In a further particularly preferred embodiment, component (C) is formed without additional synergists (component (C2)).

Component (C2) is preferably melamine or condensation products of melamine, e.g. melem, melam, melon, or reaction products of melamine with polyphosphoric acid or reaction products of condensation products of melamine with polyphosphoric acid or mixtures thereof.

As component (C2), particular preference is given to melamine polyphosphate. Such flame retardants are known from the prior art. In this respect, reference may be made to DE 103 46 3261, which is hereby expressly incorporated by reference into the present text.

As component (C1), preference is given to using a phosphinic acid salt of the general formula I and/or formula (II) and/or polymers thereof

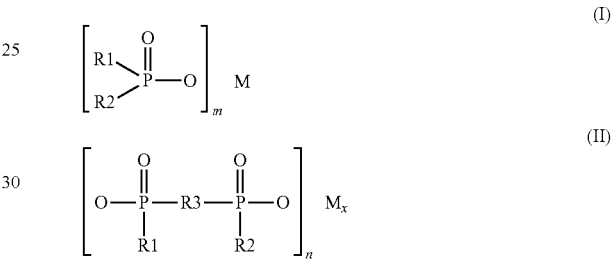

where
R1, R2 are identical or different and are each preferably C1-C8-alkyl, linear or branched, or aryl;
R3 is C1-C10-alkylene, linear or branched, C6-C10-arylene, -alkylarylene or arylalkylene;
M is a metal ion from main or transition group 2 or 3 of the Periodic Table; and
m is 2 or 3;
n is 1 or 3;
x is 1 or 2.

As metal ion M, preference is given to using Al, Ca, Ba and Zn.

In combination with the flame retardant components (C1) and (C2), it is optionally possible to add an additional from 0.5 to 5% by weight of oxygen-, nitrogen- or sulphur-containing metal compounds as stabilizers for the reduction of corrosion damage (component (C3)), where the sum of components C1 to C3 together is 100% by weight. Preferred metals here are aluminium, calcium, magnesium, barium, manganese and zinc. Suitable compounds are selected from the group consisting of the oxides, hydroxides, carbonates, silicates, borates, phosphates, stannates, salts of fatty acids and combinations or mixtures of these compounds, e.g. oxide hydroxides or oxide hydroxide carbonates. Examples are barium oxide, magnesium oxide, calcium oxide, aluminium oxide, manganese dioxide, vanadium oxide, zinc oxide, magnesium hydroxide, aluminium hydroxide, boehmite, dihydrotalcite, hydrocalumite, calcium hydroxide, tin oxide hydrate, zinc hydroxide, zinc borate, zinc sulphide, zinc phosphate, zinc carbonate, calcium carbonate, calcium phosphate, magnesium carbonate, basic zinc silicate, zinc stannate, calcium stearate, zinc stearate, magnesium stearate, barium stearate, potassium palmitate, magnesium behenate.

Furthermore, it should be emphasized in the context of the polyamide moulding compositions of the invention or the mouldings produced therefrom that excellent flame resistance is achieved in combination with the above-described excellent properties. The moulding composition is given an UL classification of V0 for 1.6 mm thick test specimens (UL-94, test in accordance with the standards of Underwriters Laboratories (U.L.), cf. wwvv.ulstandards.com).

The copolyamides of the invention achieve the fire protection classification "V0" even without addition of synergist (C2). The flame retardant added is therefore preferably made up exclusively of the components C1 and C3 together.

In a preferred embodiment, the polyamide moulding composition is generally characterized in that the proportion of component (C) is in the range 10-18% by weight.

As explained above, according to one embodiment, the component (C) is composed of a phosphinic acid salt and/or diphosphinic acid salt and a nitrogen-containing synergist and/or a nitrogen- and/or phosphorus-containing flame retardant. In this case the latter are preferably selected from among melamine and condensation products of melamine, in particular melem, melam, melon, and reaction products of melamine with polyphosphoric acid and reaction products of condensation products of melamine with polyphosphoric acid and mixtures thereof, in particular melamine polyphosphate.

The moulding compositions of the invention can also contain further additives (D) such as additives from the group consisting of inorganic stabilizers, organic stabilizers, lubricants, dyes, nucleating agents, metallic pigments, metal flakes, metal-coated particles, antistatics, conductivity additives, mould release agents, optical brighteners, natural sheet silicates, synthetic sheet silicates or mixtures of the additives mentioned. As antistatics, it is possible to use, for example, carbon black and/or carbon nanotubes in the moulding compositions of the invention. However, the use of carbon black can also serve to improve the black coloration of the moulding composition.

As sheet silicates, it is possible to use, for example, kaolins, serpentines, talc, mica, vermiculites, illites, smectites, montmorillonite, hectorite, double hydroxides or mixtures thereof in the moulding compositions of the invention. The sheet silicates can have been surface-treated or can also be untreated.

As stabilizers or aging inhibitors, it is possible to use, for example, antioxidants, light stabilizers, UV stabilizers, UV absorbers or UV blockers in the moulding compositions of the invention.

The polyamide moulding composition is preferably characterized in that it has an elongation at break of at least 5%, preferably at least 6% and particularly preferably at least 7%. For this purpose, the polyamide moulding composition is, as mentioned above, unreinforced, i.e. normally essentially or completely free of, in particular, fibrous reinforcing materials such as glass fibres, carbon fibres, polymer fibres, etc. However, in terms of component (D), the polyamide moulding composition also preferably comprises not more than 4% of particulate fillers, preferably not more than 2% of particulate fillers, particularly preferably essentially no particulate fillers at all. For the present purposes, particulate fillers are particulate kaolins, carbonates (e.g. magnesium carbonate, calcium carbonate), amorphous silica, silicates (e.g. calcium silicates such as wollastonite), powdered quartz, mica, feldspar, talc, etc.

In general, according to a further preferred embodiment, the polyamide moulding composition is characterized in that stabilizers, processing aids, inorganic stabilizers, organic stabilizers, lubricants, dyes, nucleating agents, metallic pigments, metal flakes, metal-coated particles, antistatics, conductivity additives, mould release agents, optical brighteners, natural sheet silicates, synthetic sheet silicates or mixtures of the abovementioned additives are present as additives of the component (D, preferably in a proportion in the range 1-4% by weight, with preference being given to using carbon black and/or carbon nanotubes as antistatics. The polyamide moulding composition preferably does not contain any impact modifiers as additives (D).

A further preferred embodiment is characterized in that the component (A) and/or the polyamide moulding composition in its entirety has a melting point in the range 280-315° C., particularly preferably in the range 290-310° C.

The copolyamides of the invention can be produced on conventional polycondensation plants by the process sequence precondensate and after-condensation. Chain regulators are preferably used for the polycondensation in order to regulate the viscosity. Suitable chain regulators are monoamines or monoacids such as acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octyl-amine, n-dodecylamine, n-tetradecylamine, n-hexadecylamine, stearylamine, cyclohexylamine, 3-(cyclohexyl amino)propylamine, methylcyclohexylamine, dimethylcyclohexylamine, benzylamine, 2-phenylethylamine, etc. In addition, the viscosity can be adjusted by use of an excess of diamine or diacid.

For the salt solutions to be homogeneous and clear at solution temperatures of from 180 to 230° C., from 20 to 30% of water is usually added to the monomers. To prevent excessive foaming during depressurization and degassing or during after-condensation of the melt in an extruder, an antifoam is preferably added to the mixtures. Suitable antifoams are aqueous silicone emulsions, polydimethylsiloxane on a solid support, e.g. zeolite, water-free, high molecular weight polysiloxane or siloxanes in organic, water-soluble solvents in an amount of from 0.01 to 0.5% by weight.

As polycondensation catalysts, from 0.005 to 1.5% by weight of phosphorus compounds such as phosphoric acid, phosphorous acid, hypophosphorous acid, phenylphosphonic acid, phenylphosphinic acid and/or salts thereof with 1- to 3-valent cations such as Na, K, Mg, Ca, Zn or Al and/or esters thereof, e.g. triphenyl phosphate, triphenyl phosphite or tris (nonylphenyl) phosphite, are preferably added to the monomer mixtures. Preference is given to hypophosphorous acid and sodium hydrogenphosphate monohydrate in an amount of from 100 to 500 ppm of phosphorous, based on the copolyamide.

Furthermore, the present invention also provides processes for producing such polyamide moulding compositions. In addition, it also provides mouldings produced using such polyamide moulding compositions. Blisters can be formed during soldering in the case of, for example, connectors having a critical thickness and metal inserts which conduct heat inwards. Thicknesses in the range from 1 to 2 mm are frequently particularly critical and start forming blisters at comparatively low temperatures. Without being bound thereby to a theoretical explanation or being restricted thereto, this effect can be explained by the following mechanism:

relatively thin wall thicknesses form blisters to a lesser degree because in this case no critical amount of water which is capable of forming a blister can accumulate and because water can vaporize readily on heating due to the short diffusion paths. Greater wall thicknesses are likewise less critical because thicker test bars cannot heat up completely during the short heating time. The proposed material is preferably employed in mouldings having a wall thickness in the range 0.5-3 mm, in particular 1-2 mm, with this wall thickness being present at least in the regions which are affected by heat transmission during soldering and in which blisters tend to form.

Furthermore, the present invention thus provides a moulding or mouldings which consist(s) at least partly of such polyamide moulding compositions and are produced using a polyamide moulding composition as indicated above, particularly preferably in the form of or as part of an electric or electronic passive or active component, a printed circuit board, part of a printed circuit board, a housing constituent, a film, a line, in particular in the form of or as part of the switch, a plug, a bushing, a distributor, a relay, a resistance, a condenser, a coil or a coil core, a lamp, a diode, an LED, a transistor, a connector, a regulator, an integrated circuit (IC), a processor, a controller, a memory and/or a sensor. Further mouldings are fastening elements of electric or electronic components, printed circuit boards or component groups, e.g. spacers, pins, strips, plug-in guides, screws and nuts.

Particular preference is given to a moulding in the form of or as part of a base, a plug connection, a plug or a bushing. The moulding preferably comprises functional elements which require mechanical toughness. Examples of such functional elements are film hinges, snap-in hooks and springs. Such mouldings or the polyamide moulding composition in general is in this case characterized, in particular, by having an elongation at break of at least 5%, preferably at least 6% and particularly preferably at least 7%. Further embodiments are indicated in the dependent claims.

BRIEF DESCRIPTION OF THE DRAWINGS

Preferred embodiments of the invention are described below, partly with the aid of the drawing which merely serves for the purposes of illustration and is not to be interpreted as constituting a limitation. The drawing shows in FIG. 1 the surface temperature of a 1.6 mm thick UL94 burning bar as a function of time under the conditions of test 2 (cf. also Table 4).

DESCRIPTION OF PREFERRED EMBODIMENTS

The invention is illustrated below by means of specific examples and compared with the poorer performance systems according to the prior art. The examples indicated below serve to support the invention and to demonstrate the differences from the prior art, but are not to be interpreted as restricting the general subject matter of the invention as defined in the claims.

Raw polymers RP1 to RP3:

The polyamides RP1-RP3 are produced via a precondensate and subsequent after-condensation. The formulation components as shown in Table 1 are placed together with catalyst, regulator and water in a 20 l autoclave, heated to a product temperature of 260° C. over a period of from 50 to 80 minutes, maintained at a pressure of 32 bar for one hour and subsequently discharged via a nozzle. The precondensate is dried at 120° C. under a reduced pressure of 30 mbar for 24 hours.

The polyamide precondensate obtained in this way is after-condensed in a twin-screw extruder from Werner and Pfleiderer having a screw diameter of 25 mm at prescribed process parameters (barrel temperature: 340° C., speed of rotation of the screw: 150 rpm, throughput: 6 kg/h). The melt is degassed by means of a stream of nitrogen in zone 10. The product is taken off as extrudate from a nozzle having a diameter of 3 mm and pelletized. The pellets are dried at 100° C. under a reduced pressure of 30 mbar for 24 hours.

The polyamides are injection moulded using an Arburg Allrounder 320-210-750 injection moulding machine at defined barrel temperatures of the zones 1 to 4 and a defined tool temperature to produce ISO test specimens.

The raw polymers RP1-RP3 are pure copolyamides, where RP2 and RP3 are examples according to the invention of the component (A) and RP1 is used as copolyamide component in Comparative Example C5. The raw polymers RP1-RP3 are not compounded, i.e. are without flame retardant, without ionomer and essentially without additives, in the proportions shown in Table 1. In this form, the copolyamides meet the requirements for soldering in accordance with JEDEC SML1. However, this is not a satisfactory solution since the raw polymers do not offer sufficient flame resistance in accordance with UL 94 V0.

The Examples E1-E3 and the Comparative Examples C1 to C4 use the copolyamide from Example RP3, Example E4 uses the raw polymer RP2 and the Comparative Example C5 uses the copolyamide RP1 as indicated in Table 2, but with the amounts of ionomer, flame retardant and additives indicated in Table 2 now added.

TABLE 1

Raw polymers RP1 to RP3, RP1 in accordance with JP 2928325 and RP2 in accordance with EP 1 988 113.

|  | Unit | RP1 | RP2 | RP3 |
| --- | --- | --- | --- | --- |
| Composition | | | | |
| 1,6-Hexanediamine | parts by weight | 43.00 | 6.49 | 27.42 |
| 1,10-Decanediamine | parts by weight |  | 44.38 | 17.83 |
| Terephthalic acid | parts by weight | 33.15 | 49.13 | 47.58 |
| Isophthalic acid | parts by weight |  |  | 7.17 |
| Adipic acid | parts by weight | 23.85 |  |  |
| Injection-moulding conditions | | | | |
| Barrel temperature zone 1 | ° C. | 315 | 315 | 315 |
| Barrel temperature zone 2 | ° C. | 320 | 320 | 320 |
| Barrel temperature zone 3 | ° C. | 325 | 325 | 325 |
| Barrel temperature zone 4 | ° C. | 330 | 330 | 330 |
| Tool temperature | ° C. | 120 | 130 | 130 |
| Properties | | | | |
| Solution viscosity |  | 1.67 | 1.62 | 1.66 |
| Melting point | ° C. | 310 | 295 | 309 |
| Enthalpy of fusion | J/g | 60 | 50 | 47 |
| Glass transition temp. | ° C. | 94 | 115 | 129 |
| Water absorption | % | 6.2 | 2.8 | 3.6 |
| Solderability | % | 67 | 89 | 94 |
| JEDEC SML 1 |  | yes | yes | yes |

Example E1

To produce Example E1, the raw polymer RP4 corresponding to Table 2 is compounded in a twin-screw extruder from Werner and Pfleiderer having a screw diameter of 25 mm with prescribed process parameters (barrel temperature: 320° C., speed of rotation of screw: 250 rpm, throughput: 10 kg/h). For this purpose, all components as per Table 2 with the exception of the flame retardant Exolit OP 1230 are premixed and metered by means of a balance into the intake of the twin-screw extruder. The flame retardant is likewise metered into the intake by means of a second balance. The melt is optionally slightly degassed by means of a stream of nitrogen in zone 10. The product is taken off as extrudate from a nozzle having a diameter of 3 mm and pelletized. The pellets are dried at 100° C. under a reduced pressure of 30 mbar for 24 hours.

Examples E2 to E4, and Comparative Examples C1 to C5

The Examples E2 to E4 and the Comparative Examples C1 to C5 are produced in a manner analogous to the description of the production process of Example E1.

example the addition of a nucleating agent, E3 describes the addition of a further flame retardant as synergist and E4 describes the addition of small amounts of a further polyamide.

The necessity of selecting a suitable raw polymer is demonstrated by C5. Although this composition meets the flame resistance requirements, it is not reliably solderable under JEDEC SML1 conditions. In addition, the require elongation at break of at least 5% is not achieved.

TABLE 2

Composition and properties of the compounds of Comparative Examples C1-C5 and Examples E1 to E4 Injection-moulding conditions for Comparative Examples C1 to C5 and for Examples E1 to E4 as in the case of RP3.

| | Unit | C1 | C2 | C3 | C4 | E1 | E2 | E3 | E4 | C5 |
|---|---|---|---|---|---|---|---|---|---|---|
| Raw polymer | — | RP3 | RP3 | RP3 | RP3 | RP3 | RP3 | RP3 | RP2 | RP1 |
| Polyamide | % by wt. | 84.0 | 74.0 | 74.0 | 74.0 | 74.0 | 73.9 | 74.0 | 73.5 | 74.0 |
| Irganox 1098 | % by wt. | 0.5 | 0.5 | 0.5 | 0.5 | 0.5 | 0.5 | 0.5 | 0.5 | 0.5 |
| Barium stearate | % by wt. | 0.4 | 0.4 | 0.4 | 0.4 | 0.4 | 0.4 | 0.4 | 0.4 | 0.4 |
| Manganese dioxide | % by wt. | 0.1 | 0.1 | 0.1 | 0.1 | 0.1 | 0.1 | 0.1 | 0.1 | 0.1 |
| Exolit OP1230 | % by wt. | 15.0 | 15.0 | 15.0 | 15.0 | 15.0 | 15.0 | 15.0 | 15.0 | 15.0 |
| Surlyn 9320 | % by wt. | | | | | 10.0 | 10.0 | 5.0 | 5.0 | 10.0 |
| Scona TSKD9103 GCT | % by wt. | | 10.0 | | | | | | | |
| Scona TPPP2112 GA | % by wt. | | | 10.0 | | | | | | |
| Lotader 4700 | % by wt. | | | | 10.0 | | | | | |
| MPP | % by wt. | | | | | | | | 0.5 | |
| Grivory G21 | % by wt. | | | | | | | 5.0 | | |
| Microtalc IT extra | % by wt. | | | | | | 0.1 | | | |
| Melting point | ° C. | 308 | 307 | 308 | 308 | 307 | 307 | 305 | 295 | 310 |
| Enthalpy of fusion | J/g | 50 | 34 | 35 | 36 | 37 | 36 | 37 | 50 | 60 |
| Glass transition temp. | ° C. | 125 | 123 | 122 | 121 | 120 | 122 | 122 | 115 | 94 |
| Deposits | — | no | no | no | yes | no | no | no | yes | yes |
| Solderability | % | 80 | 47 | 27 | 54 | 90 | 92 | 83 | 81 | 65 |
| JEDEC SML1 | — | yes | no | no | no | yes | yes | yes | yes | no |
| Tensile E modulus | MPa | 4100 | 3200 | 3600 | 3300 | 2900 | 2900 | 3300 | 2600 | 3300 |
| Tensile strength | MPa | 81 | 62 | 48 | 60 | 62 | 63 | 71 | 55 | 60 |
| Elongation at break | % | 3.2 | 5.4 | 2.0 | 3.8 | 7.2 | 7.3 | 5.3 | 6.8 | 4.4 |
| Impact toughness | kJ/m$^2$ | 50 | 80 | 47 | 60 | 80 | 100 | 60 | 100 | 80 |
| Notched impact toughness | kJ/m$^2$ | 4.3 | 6.2 | 5.1 | 4.5 | 6.0 | 6.5 | 5.8 | 5.1 | 5.4 |
| UL94 | — | V0 | V2 | HB | V2 | V0 | V0 | V0 | V0 | V0 |

Exolite ® OP1230: Phosphorous-organic salt (Clariant Produkte GmbH), flame retardant.
Irganox 1098: Sterically hindered phenolic antioxidant (BASF SE)
Surlyn 9320: Ethylene-methacrylic acid-acrylate terpolymer, partially neutralized with zinc ions (DuPont)
Scona TSKD9103 GCT: Styrene-ethylene-butylene-styrene block copolymer, grafted with maleic anhydride (Kometra GmbH)
Scona TPPP2112 GA: Polypropylene, grafted with 1.2% of maleic anhydride (Kometra GmbH)
Lotader 4700: Ethylene-acrylic ester-maleic anhydride terpolymer (Arkema)
MPP: Melamine polyphosphate (DSM)

C1 describes a composition which is composed essentially of raw polymer and flame retardant without addition according to the invention of completely or partially neutralized ionomer and meets the requirements for solderability and flame resistance but without having a satisfactory elongation at break (more than 5% is required).

C2 to C4 represent unsatisfactory attempts to improve the mechanical properties of the compound: although the familiar method of improving the toughness by adding an impact modifier improves the elongation at break noticeably (C4) to satisfactorily (C2), solderability and flame resistance are no longer achieved. Furthermore, deposits are observed on the mould and the injection-moulded parts when using Lotader.

Only the addition according to the invention of an ionomer solves the technical problem of increasing the toughness, indicated by the elongation at break, while maintaining the flame retardant properties in accordance with UL94 V0. In addition, the solderability is, surprisingly, generally improved (E1 and E2), or at least not made worse (E3 and E4).

Further additives with which a person skilled in the art will be familiar can be added. Thus, E2 describes by way of The measurements were carried out in accordance with the following standards and on the following test specimens.
Thermal Behaviour:
Melting point, enthalpy of fusion and glass transition temperature (Tg):
ISO standard 11357-11-2
Pellets
Differential Scanning calorimetry (DSC) was carried out at a heating rate of 20° C./min.
For the glass transition temperature (Tg), the onset temperature is reported.
Relative Viscosity:
DIN EN ISO 307, in 0.5% strength by weight m-cresol solution, temperature 20° C.,
Pellets
Tensile E Modulus, Tensile Strength and Tear Strength:
ISO 527 using an elongation rate of 50 mm/min (unreinforced variants) or an elongation rate of 5 mm/min (reinforced variants)
ISO tensile bar, standard: ISO/CD 3167, type A1, 170×20/10×4 mm, temperature 23° C.

Charpy Impact Toughness:
ISO 179/*eU
ISO test bar, standard: ISO/CD 3167, type B1, 80×10×4 mm, temperature 23° C.
*1=not instrumented, 2=instrumented
Charpy Notched Impact Toughness:
ISO 179/*eA
ISO test bar, standard: ISO/CD 3167, type B1, 80×10×4 mm, temperature 23° C.
*1=not instrumented, 2=instrumented
Water Absorption:
Weight change of tensile bars in accordance with ISO 527 in water at 95° C. for a time of 336 hours
UL94:
Burning class in accordance with UL94 on UL94 standard test specimens having a thickness of 1.6 mm.
Deposits:
To assess the deposits, plates having dimensions of 100× 100×3 mm are injection moulded under conditions as indicated in Table 1 for RP3. After 30 injection moulding cycles, the mould and the moulding are examined for deposits. If significant deposits are found in the mould or on the surface of the moulding, this is indicated by "yes" for the respective experiment on the row "deposits" in Table 2.
Solderability:
UL94 burning bars having thicknesses of 0.8, 1.6 and 3.2 mm are injection moulded. These bars are stored at 85° C. and 85% relative humidity for 168 hours in an Allen 600 controlled atmosphere cabinet from Angelantoni Industrie s.p.a. (IT) as described in the Joint Industry Standard IPC/JEDEC J-STD-020D.1 for moisture sensitivity level 1 (SML 1). 5 test bars of each of the three different thicknesses are then placed on a plate (one-sided heating) and transported at a belt speed of 200 mm/min through a Reflow soldering system RO300FC from Essemtec AG (CH). The heating zones are set to the temperatures shown in Table 3. Test 2 (one-sided) gives the prescribed soldering profile with a peak temperature of 260° C. for a 1.6 mm thick UL94 burning bar. The surface temperature of a 1.6 mm thick UL94 burning bar is above 255° C. for 54 sec and above 260° C. for 22 sec, as shown in FIG. 1. 5 test bars of each of the three different thicknesses are subsequently placed directly on the wire mesh without a plate and thus subjected to two-sided heating. To calculate the solderability, the number of test bars without blisters is divided by the total number of test bars tested (=901 and multiplied by 100%.

TABLE 3

Temperature settings of the heating zones of the Reflow soldering system.

| | Zone 1 [° C.] | Zone 2 [° C.] | Zone 3 [° C.] |
|---|---|---|---|
| Test 1 (one-sided) | 155 | 235 | 280 |
| Test 2 (one-sided) | 155 | 235 | 285 |
| Test 3 (one-sided) | 155 | 235 | 295 |
| Test 4 (two-sided) | 140 | 230 | 265 |
| Test 5 (two-sided) | 140 | 230 | 275 |
| Test 6 (two-sided) | 140 | 230 | 285 |

JEDEC SML 1:
1.6 mm thick UL94 burning bars achieve moisture sensitivity level 1 (SML 1). This means that no blisters can be observed under the conditions of test 2 (one-sided) as per Table 3 and the temperature profile shown in FIG. 1 after conditioning at 85° C. and 85% relative humidity for 168 hours.

The invention claimed is:
1. A polyamide moulding composition having the following composition:
(A) 62-87% by weight of a partially aromatic, partially crystalline copolyamide having a melting point of 270° C. to 320° C. and made up of:
100% by weight of diacid fraction composed of:
50-100% by weight of a diacid selected from the group consisting of: terephthalic acid, naphthalenedicarboxylic acid, and mixtures thereof; and
0-50% by weight of isophthalic acid;
and 100% by weight of diamine fraction composed of:
10-80% by weight selected from the group consisting of butanediamine, pentanediamine, hexanediamine or a mixture thereof; and
20-90% by weight selected from the group consisting of methyloctanediamine, nonanediamine, decanediamine, undecane-diamine and dodecanediamine or a mixture thereof;
(B) 9-15% by weight of an ionomer selected from ionomers based on the group of systems consisting of: ethylene-(meth)acrylic acid and ethlyene-(meth)acrylic acid-n-butyl acrylate;
(C) 8-18% by weight of flame retardants; and
(D) 0-5% by weight of additives;
where the components (A)-(D) add up to 100% by weight, and
wherein the polyamide moulding composition is free of fibrous reinforcing material and has an elongation at break of at least 5%.
2. The polyamide moulding composition according to claim 1, wherein the diacid fraction of the component (A) is composed of:
50-98.3% by weight of terephthalic acid; and
1.7-50% by weight of isophthalic acid.
3. The polyamide moulding composition according to claim 1, wherein the component (A) is selected from the group consisting of: 6T/9T, 6T/10T, 6T/12T, 10T/6T, 10T/10I/6T, 10T/6I, 6T/10T/6I, 6T/6I/10T/10I, and 6T/10T/10I.
4. The polyamide moulding composition according to claim 1, wherein the proportion of component (B) is in the range 9-12% by weight.
5. The polyamide moulding composition according to claim 1, wherein the ionomer of the component (B) has been prepared from the monomers α-olefin, α,β-unsaturated carboxylic acid and optionally further comonomers, where the ionomer is completely or partially neutralized by metal ions.
6. The polyamide moulding composition according to claim 1, wherein the ionomer of the component (B) is selected from among ionomers based on the following groups of systems: ethylene-acrylic acid; ethylene-methacrylic acid; ethylene-maleic anhydride; ethylene-acrylic acid-n-butyl acrylate; ethylene-methacrylic acid-n-butyl acrylate; ethylene-methacrylic acid-2-ethoxyethyl acrylate; ethylene-methacrylic acid-n-propyl acrylate; ethylene-acrylic acid-2-ethoxyethyl acrylate; ethylene-acrylic acid-n-octyl acrylate; ethylene-methacrylic acid-n-pentyl acrylate; ethylene-acrylic acid-n-pentyl acrylate; ethylene-acrylic acid-2-ethylhexyl acrylate; ethylene-acrylic acid-n-propyl acrylate; ethylene-acrylic acid-n-heptyl acrylate; ethylene-acrylic acid-2-methoxyethyl acrylate; ethylene-acrylic acid-3-methoxypropyl acrylate; ethylene-acrylic acid-3-ethoxypropyl acrylate or a combination of such ionomers.
7. The polyamide moulding composition according to claim 1, wherein the ionomer of the component (B) is selected from among ionomers based on the following group of systems: ethylene-(meth)acrylic acid and ethylene-(meth) acrylic acid-n-butyl acrylate.

8. The polyamide moulding composition according to claim 1, wherein the ionomer of the component (B) is an ethylene ionomer having the composition E/X/Y, where E is 45-94% by weight of ethylene, X is 1-20% by weight of an unsaturated carboxylic acid selected from the group consisting of: acrylic acid, methacrylic acid, maleic acid, fumaric acid, itaconic acid and monoesters of maleic, fumaric and itaconic acids and Y is 5-35% by weight of at least one further unsaturated comonomer.

9. The polyamide moulding composition according to claim 1, wherein the proportion of component (C) is in the range 10-17% by weight.

10. The polyamide moulding composition according to claim 1, wherein stabilizers, processing aids, inorganic stabilizers, organic stabilizers, lubricants, dyes, nucleating agents, metallic pigments, metal flakes, metal-coated particles, antistatics, conductivity additives, mould release agents, optical brighteners, natural sheet silicates, synthetic sheet silicates or mixtures of the additives mentioned are present as additives of the component (D).

11. The polyamide moulding composition according to claim 1, wherein the ionomer has a melt flow index (MFI) in the range 0.5-5.0 g/10 min.

12. The polyamide moulding composition according to claim 1, wherein the component (A) and/or the polyamide moulding composition as a whole has a melting point in the range 280-315° C.

13. A moulding produced using a polyamide moulding composition according to claim 1.

14. The polyamide moulding composition according to claim 1, wherein 100% by weight of diamine fraction of the component (A) is composed of 1,6-hexanediamine, and C9-C12-diamine.

15. The polyamide moulding composition according to claim 1, wherein 100% by weight of diamine fraction of the component (A) is composed of 1,6-hexanediamine, in a proportion of 51-80% by weight; C9-C12-diamine, in a proportion of 20-49% by weight.

16. The polyamide moulding composition according to claim 1, wherein the diacid fraction of the component (A) is composed of 72.0-98.3% by weight, of terephthalic acid; 1.7-28% by weight, of isophthalic acid.

17. The polyamide moulding composition according to claim 1, wherein the ionomer of the component (B) has been prepared from the monomers α-olefin, α,β-unsaturated carboxylic acid and optionally further comonomers, where the ionomer is completely or partially neutralized by metal ions, with from 3 to 100%, of the carboxylic acid groups of the ionomer being neutralized with metal ions are selected from the group consisting of Groups Ia, IIa, IIb, IIIa, IVa, VIb and VIII of the Periodic Table of the Elements.

18. The polyamide moulding composition according to claim 1, wherein the ionomer of the component (B) has been prepared from the monomers α-olefin, α,β-unsaturated carboxylic acid and optionally further comonomers, where the ionomer is completely or partially neutralized by metal ions, with from 5 to 90%, of the carboxylic acid groups of the ionomer being neutralized with metal ions selected from the group consisting of lithium, sodium, potassium, zinc, tin, calcium, barium and magnesium.

19. The polyamide moulding composition according to claim 1, wherein the proportion of component (C) is in the range 10-17% by weight, with the component (C) being composed of 60-100% by weight, of a phosphinic acid salt and/or diphosphinic acid salt and 0-40% by weight, of a nitrogen-containing synergist and/or a nitrogen- and/or phosphorus-containing flame retardant.

20. The polyamide moulding composition according to claim 1, wherein the proportion of component (C) is in the range 10-17% by weight, with the component (C) being composed of 80-100% by weight, of a phosphinic acid salt and/or diphosphinic acid salt and 0-20% by weight, of a nitrogen-containing synergist and/or a nitrogen- and/or phosphorus-containing flame retardant, wherein the nitrogen-containing synergist and/or a nitrogen- and/or phosphorus-containing flame retardant is selected from the group consisting of melamine or condensation products of melamine, reaction products of melamine with polyphosphoric acid, reaction products of condensation products of melamine with polyphosphoric acid and mixtures thereof.

21. The polyamide moulding composition according to claim 1, wherein carbon black and/or carbon nanotubes as antistatics are present as additives of the component (D).

22. The polyamide moulding composition according to claim 1, wherein the ionomer has a melt flow index (MFI) in the range 0.5-2.0 g/10 min.

23. The polyamide moulding composition according to claim 1, wherein the component (A) and/or the polyamide moulding composition as a whole has a melting point in the range 290-310° C.

24. A moulding produced using a polyamide moulding composition according to claim 1, wherein the moulding is in the form of or as part of one of the following: an electric or electronic passive or active component, a printed circuit board, a housing constituent, a film, a line, a switch, a plug, a bushing, a distributor, a relay, a resistance, a condenser, a coil, a coil core, a lamp, a diode, an LED, a transistor, a connector, an integrated circuit (IC), a processor, a controller, a regulator, a memory, a sensor, a fastening element for electric or electronic components, printed circuit boards or component groups, spacers, pins, strips, plug-in guides, screws, nuts, a base, a plug connector, a plug, a bushing, a film hinge, a snap-in hook and a spring tongue.

25. The moulding according to claim 13, wherein the polyamide moulding composition has an elongation at break of at least 7%.

* * * * *